May 12, 1931.  A. U. AYRES  1,805,230
LUBRICATING SYSTEM
Filed March 22, 1926   2 Sheets-Sheet 1

Inventor:
Arthur U. Ayres,
By
Attorney.

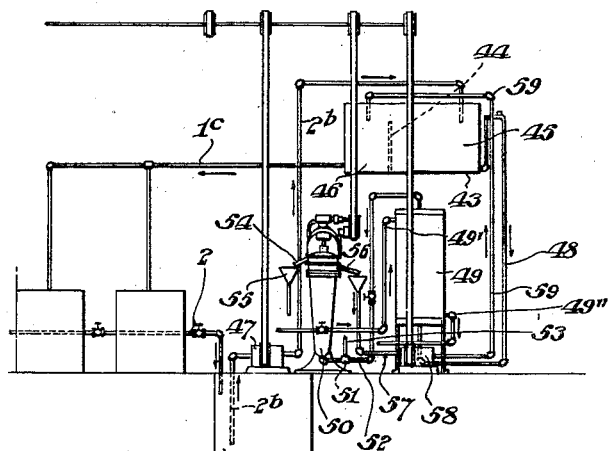
Fig. 3.
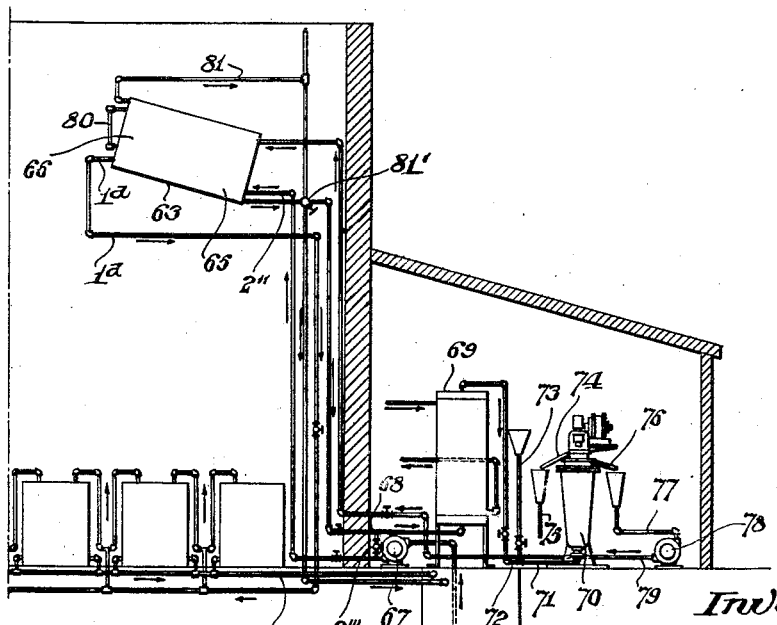
Fig. 4.
Inventor:
Arthur U. Ayres,
Attorney.

Patented May 12, 1931

1,805,230

UNITED STATES PATENT OFFICE

ARTHUR U. AYRES, OF PHILADELPHIA, PENNSYLVANIA, ASSIGNOR TO THE SHARPLES SPECIALTY COMPANY, OF PHILADELPHIA, PENNSYLVANIA, A CORPORATION OF DELAWARE

LUBRICATING SYSTEM

Application filed March 22, 1926. Serial No. 96,477.

My invention is designed to provide means whereby bearings, particularly of internal combustion engines of the Diesel type, may be continuously supplied with a purified lubricant freed from the moisture, carbon, sludge, and other impurities and contaminations accumulating therein in use.

By my improvements the pollutants of the oil are separated therefrom by both subsidence and centrifugence; the gravity settling effecting deposition of the heavy sludge and the formation of a supernatant portion of substantially pure oil which is available for immediate recirculation in the lubricating system, while the subjacent portion or body of the oil is purified by centrifugence and combined with the supernatant oil. The courses of flow of the oil are so arranged as to prevent intermingling by circulation of the purified oil and the dirty settling oil, which are maintained in separate strata, layers, or zones.

In accordance with my improvements, the course of the oil through the centrifuge preferably forms a by-pass communicating at one end with the dirty or settling oil zone and at the other end with the clean oil zone, and such zones are so connected that in the event the by-pass should be shut off the normal flow therethrough would be so diverted as to supply any deficiency in the purified oil zone.

My improvements are further designed to provide means for establishing and maintaining a hydrostatic barrier to the escape of oil from the centrifuge to waste when oil is initially admitted to the rotating bowl or when the input contains insufficient moisture to establish a stratum sealing the waste outlet of the centrifuge bowl.

Further characteristics and advantages of my invention will more fully appear from the following description and the accompanying drawings illustrating several layouts embodying my improvements.

Figure 1:
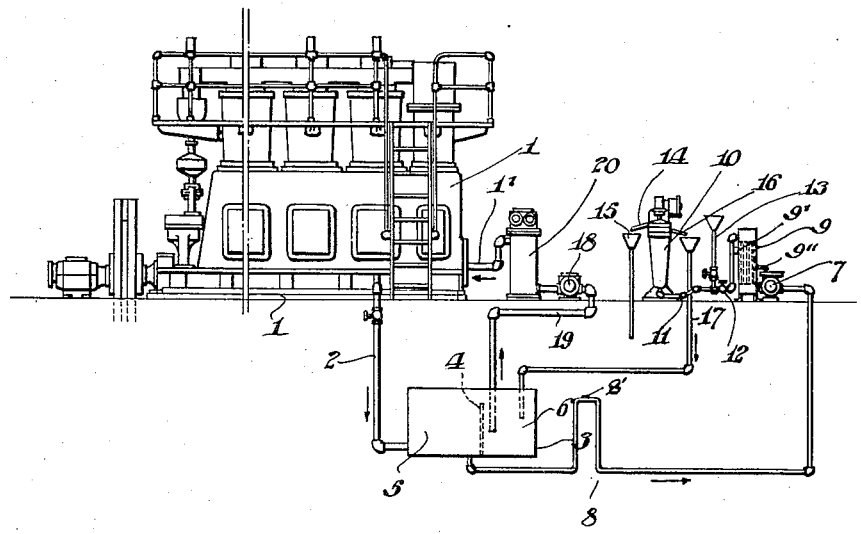
Figure 2:
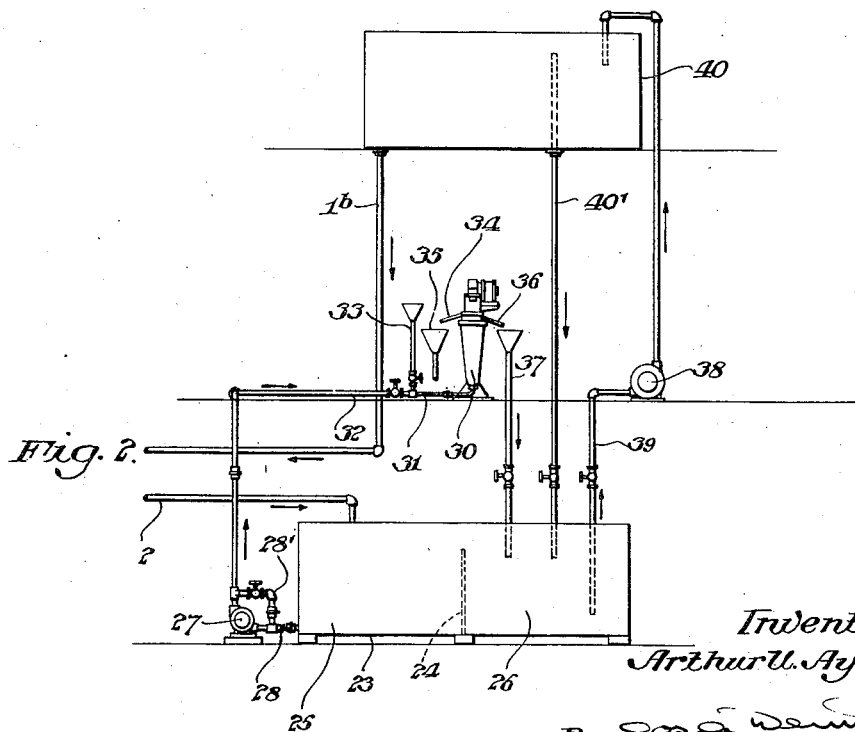

In the drawings, Fig. 1 is a diagrammatic elevation of a system embodying my improvements; Fig. 2 is a diagrammatic elevation of a similar system supplemented by means for supplying the purified lubricant to the distributing system under a gravity head; Fig. 3 is a diagrammatic illustration of a further modified system in which both the distributing system and centrifuge are supplied under a gravity head; and Fig. 4 is a diagrammatic elevation of a further modified system in which the stratification or zoning of the oil is effected and maintained by the differences in specific gravity and inertia of the several portions thereof.

As illustrated in Fig. 1, the lubricant dripping or flowing from the bearings to the base of an internal combustion engine 1 of the Diesel type is discharged through a valve controlled conduit 2 to the bottom of a tank 3 divided by a baffle or partition 4 into a settling chamber or zone 5, to which the pipe 2 discharges, and a purified oil chamber or zone 6, to which the supernatant portion of oil in the chamber 5 is decanted over the baffle.

When the head of oil in the chamber 5 rises a predetermined distance above the baffle 4, the lower portion of oil in the chamber flows therefrom through the trapped conduit 8 having an inverted U-shaped section containing a vent 8' to prevent siphoning. The relative heights of the partition 4 and apex of the inverted U-section are so proportioned as to secure desired normal flows over the partition and through the conduit. The oil flowing through the conduit 8 is pumped by a pump 7 to a heater 9, preferably heated by circulating water, heated in the casing of the engine or by products of combustion discharged from the cylinders, and supplied to the heater through the pipe 9' and discharged through the pipe 9''.

A centrifuge 10, preferably of the type shown in Sharples Patent No. 1,320,419, has its bowl supplied from the bottom through a forked supply pipe 11; one valve controlled branch 12 of the supply pipe being connected with the oil outlet from the heater and the other valve controlled branch of the supply pipe terminates in a funnel 13 for the introduction of sealing fluid to the bowl. The outer layer of heavier constituents in the bowl, viz. water, the bulk of the dirt, sludge, and the like, is discharged through a spout 14 to the waste pipe 15, and the inner layer of purified oil is discharged through a spout 16 to the flaring end of a conduit 17 emptying into the chamber 6. Any dirt and sludge remaining in the bowl may be cleaned therefrom when the centrifuge is stopped.

A pump 18 sucks purified oil through the pipe 19 from the chamber 6 from a point above the bottom thereof and pumps it to the cooling reservoir 20, from which it flows under pressure to the engine bearings through the lubricant distributing system 1', which may be of the pressure type.

As illustrated in Fig. 2, the supernatant portion of the oil supplied from the engine 1 through the drip pipe 2 to the chamber or zone 25 of the tank 23 is decanted over the partition or baffle 24 into the clean oil zone or chamber 26. The foul lower portion of the oil in the chamber 25 flows therefrom through the pipe 28, which may have inserted therein a vented inverted U-shaped section similar to the U-shaped section of the pipe 8 and having a predetermined height relative to the partition 24. The discharging oil is pumped by a pump 27 through the branch 32 to the supply pipe 31 of the centrifuge 30. A valve controlled by-pass 28' around the pump prevents excessive flow to the centrifuge and permits return flow to the chamber 25 when desired. The valve controlled branch 33 of the pipe 31 terminates in a funnel or other means for supplying a sealing liquid to the bowl.

The centrifuge bowl discharges separated water and impurities through the spout 34 to the waste pipe 35 and discharges purified oil through the spout 36 and conduit 37 to the chamber or zone 26. A pump 38 draws oil from the clean oil chamber 26 from a point above the bottom thereof and discharges it to a cooling reservoir 40, from which it flows by gravity through the distributing system 1b. An overflow pipe 40' returns to the chamber 26 any excess of oil pumped to the reservoir 40.

It will, of course, be understood that a heater may be inserted in the pipe line leading from the pump 27 to the centrifuge if desired.

As illustrated in Fig. 3, the drips discharged from the engine through the conduit 2 are given a preliminary settling in the collecting tank 2a from which the oil is pumped through a conduit 2b by a pump 47 into the settling chamber or zone 45 of the elevated tank 43. The supernatant portion of the oil in the chamber 45 is decanted over the baffle 44 into the chamber or zone 46, where it is cooled and supplied to the engine bearings through the gravity distribution system 1c.

The dirtier portion of the oil in the chamber 45 flows by gravity to the heater 49 through the trapped pipe 48 having an inverted U-shaped section with its vented apex in predetermined relation to the partition 44. The oil circulates in the heater countercurrent to water heated by the engine casing or exhaust and supplied and discharged through the respective pipes 49', 49".

A centrifuge 50 has an inlet 51 provided with a valve controlled branch 52 communicating with the oil outlet of the heater and a valve controlled branch 53 communicating with a funnel or source of sealing liquid. Dirt and water are discharged from the centrifuge spout 54 to the waste pipe 55, and purified oil is discharged from the centrifuge spout 56 to the pipe 57 and pump 58 by which it is delivered through the pipe 59 to the chamber 46 for mixture with the decantate therein and recirculation to the engine bearings.

As illustrated in Fig. 4, the collected drips are discharged from the pipe 2 into the receiver 2' and pumped therefrom by the pump 67 through the pipe 2" to the lower corner of the reservoir 63, which is inclined to accentuate the line of demarcation between the dirty portion of the oil in the zone 65 and the clean portion of the oil in the zone 66, from which oil is withdrawn through the pipe 1d for distribution by gravity to the engine bearings.

The dirty oil from the zone 65 flows by gravity through the valve controlled pipe 68 to the heater 69. If desired, dirty oil may be introduced directly into the pipe 68 from the pipe 2" through the valved by-pass 2'''.

A centrifuge 70 has its inlet 71 connected with the oil outlet of the heater and with a source of supply of a sealing liquid by the respective pipes 72 and 73, as previously described. Water and dirt are discharged through the spout 74 to the waste pipe 75, and purified oil is discharged through the spout 76 to the pump 78, by which it is forced through the pipe 79 to the clean oil zone 66 of the reservoir 63. A sight gage 80 indicates the oil level in the reservoir 63. A valved connection 81' between the pipes 81 and 68 permits the reservoir 63 to be drained if desired to the tank 2'.

It will be understood that, in all the layouts illustrated, the used lubricant is collected and settled so as to divide it into two portions by subsidence, and the heavier portion is centrifuged and combined with the lighter portion for recirculation to the engine bearings.

The escape of oil to waste through the centrifuge is prevented by the introduction into the centrifuge of a sealing liquid, which forms an outer stratum maintained at a constant thickness either by water extracted from the oil or by liquid introduced through the supply branch to compensate for leakage.

Preferably, the heavier portion of the oil is heated by waste engine heat before introduction into the centrifuge and cooled before redelivery to the engine, the admixture with the centrifuged oil of the unheated portion of oil purified by subsidence minimizing the cooling required.

Should the by-pass containing the centrifuge, and communicating at one end with the dirty oil zone and at the other end with the clean oil zone, be for any reason shut off, the oil normally diverted thereto is, after subsidence, passed directly from the dirty oil zone to the clean oil zone that there can be no dearth of oil supply to the engine.

Having described my invention, I claim:

1. A lubricating system for supplying oil to parts to be lubricated which comprises means for collecting and settling oil that has been used for the lubrication of said parts, means for centrifuging a heavier portion of the settled oil, and means for recirculating to said parts the lighter portion of the settled oil together with centrifuged oil both substantially free of unsettled oil in a continuous sequence of operations.

2. A lubricating system comprising a collecting reservoir, a chamber supplied with lubricant from said reservoir, a centrifuge supplied with lubricant from said reservoir, and means comprising a trapped conduit for supplying lubricant to said centrifuge from said reservoir and controlling the flow from said reservoir to said chamber said conduit being vented at substantially the level at which it is desired to keep oil in the reservoir.

3. A lubricating system comprising means forming a plurality of communicating chambers, means permitting limited flow from one to the other of said chambers, a centrifuge, and means comprising a vented conduit having an inverted U-section for supplying said centrifuge from one of said chambers, said means last named preventing flow to the centrifuge from said chamber when there is no flow therefrom to the other chamber.

4. In a system for the lubrication of an engine, a settling tank, means for conducting thereto oil that has been used in the lubrication of the engine, means for conducting back to the engine for the lubrication thereof, supernatant oil of said settling tank substantially free of unsettled oil, a centrifugal purifier, means for conducting oil from said tank to said purifier, and means for introducing centrifuged oil into the oil passing back to the engine.

5. In a system for the lubrication of an engine, a settling tank, means for conducting thereto oil that has been used in the lubrication of the engine, means for conducting back to the engine for the lubrication thereof supernatant oil of said settling tank substantially free of unsettled oil, a centrifugal purifier, means for conducting oil from a lower level of said tank to said purifier, and means for introducing centrifuged oil into the oil passing back to the engine.

6. In a system for the lubrication of an engine, a settling tank, having a partition extending upwardly from the bottom thereof and dividing said tank into first and second compartments and provided with a weir for controlling flow of liquid from said first compartment to said second compartment, means for conducting to said first compartment oil that has been used for the lubrication of said engine, means for conducting back to said engine for the lubrication thereof oil that flows over said weir, a centrifugal purifier, means for conducting oil from a lower level of said first compartment to said purifier, and means for conducting oil from said purifier to the oil passing back to said engine.

7. In a system for the lubrication of an engine, means for collecting oil that has been used in the lubrication of the engine, a settling tank, means for conducting to said tank oil collected by said collecting means, means for conducting back to the engine for the lubrication thereof supernatant oil of said settling tank substantially free of unsettled oil, a centrifugal purifier, means for conducting oil from said tank to said purifier, and means for introducing centrifuged oil into the oil passing back to the engine.

8. In a system for the lubrication of an engine, a settling tank, means for conducting thereto oil that has been used in the lubrication of the engine, means for conducting from an upper level of said tank back to the engine oil for the lubrication thereof and substantially free of unsettled oil, a centrifugal purifier, a pipe from a lower level of said tank to said purifier and including an inverted U-shaped portion that prevents flow of oil through said pipe to said purifier when the oil in said tank is below a predetermined level, and means for introducing centrifuged oil into the oil passing from said upper level of said tank to the engine.

9. In a system for the lubrication of an engine, a settling tank, means for conducting thereto oil that has been used in the lubrication of the engine, means for conducting back to the engine for the lubrication thereof supernatant oil of said settling tank substantially free of unsettled oil, a centrifugal purifier, means for conducting oil from said tank to said purifier, means for supplying sealing liquid to said purifier to form a hydrostatic barrier to the escape of oil therefrom to waste, and means for introducing centrifuged oil into the oil passing back to the engine.

10. In a lubricating system for engines, means for purifying the lubricant comprising a settling chamber and a centrifuge, means for conducting a flow of contaminated lubricant that has been used in lubricating the engine to said settling chamber, means for conducting the supernatant lubricant from the settling chamber back to the engine parts to be lubricated out of contact with the said contaminated lubricant, means for conducting a heavier portion of lubricant from the settling chamber to the centrifuge and for conducting the centrifuged lubricant to the supernatant lubricant to pass therewith to the engine parts to be lubricated.

11. In a system for continuously purifying lubricant for engine parts requiring lubrication, a settling chamber, a centrifuge, means for conducting contaminated lubricant from the lubricated parts to the settling chamber, means for conducting supernatant lubricant from the settling chamber back to the parts to be lubricated and maintaining the purified lubricant substantially out of contact with contaminated lubricant, means for conducting a heavier portion of the lubricant from said chamber to said centrifuge, and means for conducting the centrifugally purified lubricant to the supernatant lubricant for conduction therewith back to the parts to be lubricated.

In testimony whereof I have hereunto set my name this 17th day of March 1926.

ARTHUR U. AYRES.